United States Patent [19]
Kassner et al.

[11] Patent Number: 4,507,393
[45] Date of Patent: Mar. 26, 1985

[54] HIGHLY PREFRACTIVE, LOW DISPERSION OPTICAL GLASS SUITABLE FOR MULTIFOCAL CORRECTIVE LENSES

[75] Inventors: Reinhard Kassner, Alfeld, Fed. Rep. of Germany; Karl-Heinz Mader, Clarks Summit; Lee M. Cook, West Pittston, both of Pa.

[73] Assignee: Schott Glass Technologies, Inc., Duryea, Pa.

[21] Appl. No.: 522,279

[22] Filed: Aug. 11, 1983

[51] Int. Cl.³ .......................... C03C 3/08; C03C 3/10
[52] U.S. Cl. ........................................ 501/75; 501/903
[58] Field of Search ................................... 501/75, 903

[56] References Cited

U.S. PATENT DOCUMENTS

| | | | |
|---|---|---|---|
| 2,214,385 | 9/1940 | Scott et al. | 501/75 |
| 2,523,265 | 9/1950 | Armistead | 501/75 |
| 3,740,242 | 6/1973 | Faulstich et al. | 501/75 |
| 4,066,464 | 1/1978 | Faulstich et al. | 501/75 |
| 4,213,787 | 7/1980 | Faulstich et al. | 501/75 |
| 4,351,906 | 9/1982 | Boudot | 501/74 |

FOREIGN PATENT DOCUMENTS

| | | |
|---|---|---|
| 7573914 | 6/1975 | Japan . |
| 7828448 | 8/1978 | Japan . |

Primary Examiner—Mark Bell
Attorney, Agent, or Firm—Millen & White

[57] ABSTRACT

An ophthalmic glass particularly useful as a segment glass consists essentially of, in weight percent:

| | |
|---|---|
| $SiO_2$ | 23–32 |
| $B_2O_3$ | 4–7 |
| $Al_2O_3$ | 0.5–3 |
| BaO | 23–30 |
| PbO | 15–30 |
| $TiO_2$ | 0.5–10 |
| $La_2O_3$ | 5–20 |
| $Nb_2O_5$ | 0–1. |

12 Claims, No Drawings

HIGHLY PREFRACTIVE, LOW DISPERSION OPTICAL GLASS SUITABLE FOR MULTIFOCAL CORRECTIVE LENSES

BACKGROUND OF THE INVENTION

This invention relates to an improved optical glass having special application as a segment glass (or button) for use in the manufacture of compound optical elements such as multifocal corrective lenses.

Multifocal ophthalmic lenses are conventionally fabricated by fusing one or more segments of a glass with a bulk crown glass. The refractive index of the segment glass is higher than that of the bulk glass making up the lens blank. The index of refraction of the segment glass determines the degree of visual correction which is achieved.

In addition to the necessary index of refraction, segment glasses must closely match certain critical properties of the base glass. These include comparable values of thermal expansion, viscosity characteristics, and softening point. Furthermore, it is necessary that the segment glass have a relatively low dispersion and be of overall high quality. Of course, it is also preferred that the segment glass be of low density, thereby providing lower weight pieces.

Many such segment glasses are known and are matched with various types of crown glass. See, for example, U.S. Pat. No. 4,351,906. However, the segment glass of this reference and others is inappropriate for a prime use of this invention, i.e., as a segment glass in conjunction with Schott Glass S-1018. This is clear from the dramatically different composition which is involved.

Other prior art references disclosing somewhat related glasses are U.S. Pat. No. 3,022,182, JP-PS No. 7573914 and JP-PS No. 7828448. The first of these is significantly different, e.g., in that it permits no boron or aluminum components. The second is different, e.g., in that it requires significant amounts of tantalum and zirconium. The third is different in that it requires significant amounts of lithium, for example.

SUMMARY OF THE INVENTION

It is an object of this invention to provide a high quality optical segment glass having a relatively high refractive index and a relatively low dispersion compared to standard opthalmic glass compositions.

It is another object of this invention to provide such a glass which is useful as a segment glass in multifocal corrective lenses having high refractive index, low dispersion and low density.

It is yet another object of this invention to provide such a glass which is particularly useful as a segment glass in conjunction with glasses such as Schott glass S-1018.

It is a further object of this invention to provide such a glass which is useful as a segment glass in conjunction with conventional processes of multifocal ophthalmic lens production.

It is another object of this invention to provide such a glass which can also be used as an ophthalmic glass per se, e.g., in single element lenses, simple optical elements and also in other compound optical elements.

Upon further study of the specification and appended claims, further objects and advantages of this invention will become apparent to those skilled in the art.

These objects have been obtained by the present invention by providing an optical quality glass suitable for use in eyeglass lenses, particularly as a segment glass in multifocal lenses, and which has a refractive index $n_D$ of at least 1.730, preferably 1.733–1.750; an Abbe number $V_d$ of at least 33, preferably 35–40; a density of not more than 4.45 g/cm$^3$, preferably 4.37–4.41 g/cm$^3$, and a coefficient of thermal expansion (20°–300° C.) of not more than $83 \times 10^{-7}$ per °C. and not less than $77 \times 10^{-7}$ per °C., preferably 79–81 $10^{-7}$ per °C., and which contains at least 90 mole percent of $SiO_2$, $B_2O_3$, $Al_2O_3$, BaO, PbO, $TiO_2$, $La_2O_3$, and $Nb_2O_5$ and consists essentially of in wt.%:

|  | General | Preferred |
| --- | --- | --- |
| $SiO_2$ | 23–32% | 26–28% |
| $B_2O_3$ | 4–7% | 5.0–6.0% |
| $Al_2O_3$ | 0.5–3% | 0.9–1.1% |
| BaO | 23–30% | 25–27% |
| PbO | 15–30% | 20–24% |
| $TiO_2$ | 0.5–10% | 2–4% |
| $La_2O_3$ | 5–20% | 13–15% |
| $Nb_2O_5$ | 0–1% | 0.9–1.0% |

Sum Ba + La 28–50%, typically about 40%
Sum $TiO_2$ + $Nb_2O_5$, 0.5–11%, typically about 4%

DETAILED DISCUSSION

As can be seen from the following typical properties of S-1018 glass (Schott 1.60 Crown Glass), the segment glass of this invention is extremely useful and compatible as a segment glass therefor:

| Refractive index | 1.601 |
| --- | --- |
| Abbe number | 40.7 |
| Coefficient of thermal expansion (per °C.), (20° C.–300° C.) | $79.5 \times 10^{-7}$ |
| Density (g/cm$^3$) | 2.62 |
| Softening point (°C.) | 751 |
| Strain point (°C.) | 587 |
| Annealing point (°C.) | 609 |

The softening points $T_s$ (°C.) of the glasses of this invention are generally in the range of 730–740. Typically, strain points and annealing points for the glasses of this invention are 585–595, and 610–616, respectively.

The glass compositions of this invention are characterized by their low cost and excellent optical properties as discussed above. In addition, they are notable in that they lack alkali metal oxides which ordinarily are required in related glasses in order to achieve the desired refractive index and viscosity values. However, in the glass of this invention, it has been discovered that these alkali metal oxides can be omitted while still achieving the surprising properties of this invention and also that the presence of some alkali metal oxides, e.g., Li$_2$O can adversely affect the important properties, especially the coefficient of thermal expansion. The glasses furthermore lack zirconium and tantalum. This contributes markedly to their lower cost and low density properties.

Of course, in addition to the ingredients listed above, the glasses of this invention can contain conventional refining agents in the conventional necessary amounts. Such agents include especially As$_2$O$_3$, and Sb$_2$O$_3$, typically in amounts of 0.1–1.0 wt. %.

The general content of SiO$_2$ in the glasses of this invention is 23–32%, preferably 26–28%. SiO$_2$ is necessary for glass stability. Too little SiO$_2$ (levels below 23%) result in low chemical durability and crystallization effects which are undesirable both in manufacturing and in the multifocal fusion process. Too high a $SiO_2$ content (above 32%) leads to unacceptably high annealing and softening points for successful use with the preferred S-1018 major glass.

The general amount of $B_2O_3$ is the glasses of this invention is 4–7%, preferably 5.0–6.0%. Boron oxide is a necessary component in order to assure proper melting characteristics, forming viscosity properties, and control of thermal expansion. Boron oxide levels below 4% lead to unacceptably high annealing and softening points, while levels above 7% can lead to undesirably low thermal expansion coefficients.

The general amount of $Al_2O_3$ is 0.5–3 wt.%, preferably 0.9–1.1 wt.%. This ingredient is necessary in order to provide proper expansion properties as well as high chemical durability. Levels above these limits provide little additional increase in chemical durability while strongly increasing annealing and softening points.

BaO is required in amounts of 23–30 wt. %, preferably 25–27 wt. %. Its primary function is to ensure correct refractive index and viscosity characteristics. BaO levels below 23% have too low a refractive index, while BaO levels above 30% result in undesirably low annealing and softening temperatures.

PbO is generally contained in amounts of 15–30 wt. %, preferably 20–24 wt. %, and functions primarily to increase refractive index and lower viscosity. The upper and lower limits for PbO are fixed for much the same reasons as BaO.

$TiO_2$ is contained in the glasses of this invention in general amounts of 0.5–10 wt.%, preferably 2–4 wt. %. It is a secondary additive whose major effect is to provide satisfactorily low glass densities concomitant with high indices of refraction. $TiO_2$ levels below 0.5% have no significant effects, while too high a level (>10%) may result in undesirably high crystallization rates, a serious problem in multifocal fusion processes.

General amounts of $La_2O_3$ are 5–20 wt.%, preferably 13–15 wt.%. Lanthanum oxide functions to increase refractive index while maintaining low dispersion (high Vd). Levels below 13% do not permit the attainment of desired index and dispersion, while higher levels (above 15%) lead to crystallization effects.

Typically, the amounts of $Nb_2O_5$ are 0–1 wt.%, preferably 0.9–1.0 wt. %, in, often, maximum amounts of 0.5 or 0.6 wt.%. Niobium oxide primarily functions to increase refractive index while maintaining low dispersion. Levels of $Nb_2O_5$ above 1% result in significant increases in viscosity, density and glass cost.

The various end points that define the ranges of the amounts of each ingredient can be varied, within the defined ranges, to establish narrower ranges. That is, each range defined above includes many narrower ranges within it which are part of this invention. For example, a range of 15–30% is given for PbO. This range includes the narrower ranges 15.1–30%, 15–29.9%, 15.1–29.9%, 15.2–30%, etc., i.e., the narrower included ranges wherein one or both of the end points are varied by one or more multiples of 0.1%.

Thus, the general range 15–30% also includes the narrower ranges 15.5–30%, 15–29.5%, 15.5–29.5%, etc., as well as the mentioned preferred ranges described above. The ranges of other ingredients similarly define corresponding narrower ranges.

The glasses of this invention can be prepared using fully conventional techniques normally employed for glasses of this type. For example, the usual raw materials corresponding to the oxides required in the glasses of this invention, e.g., oxides per se, carbonates, nitrates, hydroxides, etc., are blended into a melt in amounts corresponding to the amounts desired in the final glass. Typical melting temperatures are 1000°–1200° C. Conventional crucibles or tanks, e.g., ceramic or platinum containers can be used. The homogeneous melt is then further treated conventionally, e.g., refined, cast into molds, gradually cooled, fused to glass blanks, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

The following describes the preparation of the glass designated below as the preferred composition G. Corresponding procedures were used to prepare the other glass compositions summarized in the following table.

GLASS PREPARATION

The following batch materials were weighed and then mixed thoroughly:

| Batch Material | Amount (kg) |
| --- | --- |
| Silicon dioxide | .271 |
| Boric acid | .093 |
| Aluminum hydrate | .016 |
| Barium nitrate | .437 |
| Red lead | .233 |
| Titanium dioxide | .027 |
| Lanthanum oxide | .146 |
| Niobium pentoxide | .010 |
| Arsenic trioxide | .001 |

The mixed batch is then melted in a 0.5 liter capacity platinum crucible heated by induction at 1250° C. Following melting, the glass is homogenized and refined at 1450° C. for 3 hours. After reducing the temperature to 1100° C., the glass is cast into graphite coated steel molds and annealed using an annealing temperature of 615° C. and a cooling rate of 30° C./hr. Following annealing, bifocal segments are prepared from castings using conventional grinding and polishing techniques.

The following table summarizes several examples of glasses of this invention as well as their properties. Examples A, E and G are preferred.

TABLE

| Weight % | A | B | C | D | E | F | G |
| --- | --- | --- | --- | --- | --- | --- | --- |
| $SiO_2$ | 26.0 | 26.0 | 26.0 | 26.0 | 26.0 | 26.8 | 27.1 |
| $B_2O_3$ | 5.1 | 5.1 | 5.1 | 5.6 | 5.3 | 5.3 | 5.3 |
| $Al_2O_3$ | 1.0 | 1.0 | 1.0 | 1.0 | 1.0 | 1.0 | 1.0 |
| BaO | 26.5 | 25.5 | 25.5 | 25.5 | 25.5 | 25.5 | 25.5 |
| PbO | 22.8 | 23.8 | 22.8 | 22.8 | 22.8 | 22.8 | 22.8 |

TABLE-continued

| Weight % | A | B | C | D | E | F | G |
| --- | --- | --- | --- | --- | --- | --- | --- |
| $TiO_2$ | 4.0 | 4.0 | 4.0 | 3.5 | 3.8 | 3.0 | 2.7 |
| $La_2O_3$ | 14.5 | 14.5 | 14.5 | 14.5 | 14.5 | 14.5 | 14.5 |
| $Nb_2O_5$ | — | — | 1.0 | 1.0 | 1.0 | 1.0 | 1.0 |
| $As_2O_3$ | 0.1 | 0.1 | 0.1 | 0.1 | 0.1 | 0.1 | 0.1 |
| $n_D$ | 1.74941 | 1.74432 | 1.75459 | 1.74869 | 1.75041 | 1.74111 | 1.73739 |
| $n_F - n_C$ | 0.02053 | 0.02073 | 0.02108 | 0.02051 | .020679 | -.019945 | .019674 |
| $V_D$ | 36.5 | 35.9 | 35.8 | 36.5 | 36.29 | 37.16 | 37.48 |
| $\rho$ (g/cm$^3$) | 4.450 | 4.370 | 4.438 | 4.436 | 4.439 | 4.413 | 4.407 |
| $CTE_{20-300° C.}$ | 81.9 | 79.4 | 81.1 | 82.2 | 82.6 | 81.9 | 80.9 |
| Tg (°C.) | 602 | 602 | 606 | 599 | 605 | 602 | 606 |
| log $\mu$ = 7.6 (°C.) | 733 | 734 | 738 | 732 | 731 | 740 | 737 |
| log $\mu$ = 4 (°C.) | — | — | — | — | 874 | 885 | 880 |
| *Fusion Strain (nm/cm) | 71T | 235C | 25T | 75T | 19T | — | 40T |

*Note:
CTE of Fusion Stand. (Schott S-1018) = 78.5,
nominal = 79.5 $1\alpha \sim 50$ nm/cm
T = Tension
C = Compression The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass having a refractive index of at least 1.730, an Abbe number of at least 33, a density of not more than 4.45 g/cm$^3$, and a coefficient of thermal expansion of not more than 83 and not less than 77×10$^{-7}$/°C. over 20°–300° C., and consisting essentially of, in wt.%:

| | |
| --- | --- |
| $SiO_2$ | 23–32 |
| $B_2O_3$ | 4–7 |
| $Al_2O_3$ | 0.5–3 |
| BaO | 23–30 |
| PbO | 15–30 |
| $TiO_2$ | 0.5–10 |
| $La_2O_3$ | 5–20 |
| $Nb_2O_5$ | 0–1. |

2. A glass of claim 1 having the following properties:

| | |
| --- | --- |
| refractive index | 1.733–1.750 |
| Abbe number | 35–40 |
| density (g/cm$^3$) | 4.37–4.41 |
| $CTE_{20-300° C.}$ (per °C.) | 79–81 × 10$^{-7}$. |

3. A glass of claim 1 consisting essentially of:

| | |
| --- | --- |
| $SiO_2$ | 26–28% |
| $B_2O_3$ | 5.0–6.0% |
| $Al_2O_3$ | 0.9–1.1% |
| BaO | 25–27% |
| PbO | 20–24% |
| $TiO_2$ | 2–4% |
| $La_2O_3$ | 13–15% |
| $Nb_2O_5$ | 0.9–1.0%. |

4. A glass of claim 2 consisting essentially of:

| | |
| --- | --- |
| $SiO_2$ | 26–28% |
| $B_2O_3$ | 5.0–6.0% |
| $Al_2O_3$ | 0.9–1.1% |
| BaO | 25–27% |
| PbO | 20–24% |
| $TiO_2$ | 2–4% |
| $La_2O_3$ | 13–15% |
| $Nb_2O_5$ | 0.9–1.0%. |

5. A glass of claim 1 consisting essentially of the following approximate amounts:

| | |
| --- | --- |
| $SiO_2$ | 26.0 |
| $B_2O_3$ | 5.1 |
| $Al_2O_3$ | 1.0 |
| BaO | 26.5 |
| PbO | 22.8 |
| $TiO_2$ | 4.0 |
| $La_2O_3$ | 14.5. |

6. A glass of claim 1 consisting essentially of the following approximate amounts:

| | |
| --- | --- |
| $SiO_2$ | 26.0 |
| $B_2O_3$ | 5.3 |
| $Al_2O_3$ | 1.0 |
| BaO | 25.5 |
| PbO | 22.8 |
| $TiO_2$ | 3.8 |
| $La_2O_3$ | 14.5 |
| $Nb_2O_5$ | 1.0. |

7. A glass of claim 1 consisting essentially of the following approximate amounts:

| | |
| --- | --- |
| $SiO_2$ | 27.1 |
| $B_2O_3$ | 5.3 |
| $Al_2O_3$ | 1.0 |
| BaO | 25.5 |
| PbO | 22.8 |
| $TiO_2$ | 2.7 |
| $La_2O_3$ | 14.5 |
| $Nb_2O_5$ | 1.0. |

8. In a multifocal ophthalmic lens comprising a segment glass fused to a compatible crown glass, the improvement wherein the segment glass is a glass of claim 1.

9. In a multifocal ophthalmic lens comprising a segment glass fused to a compatible crown glass, the improvement wherein the segment glass is a glass of claim 3.

10. A multifocal lens of claim 8 wherein the crown glass has substantially the following properties:

| | |
|---|---|
| Refractive Index | 1.601 |
| Abbe number | 40.7 |
| Coefficient of thermal expansion (per °C., (20° C.-300° C.) | $79.5 \times 10^{-7}$ |
| Density (g/cm$^3$) | 2.62 |
| Softening point (°C.) | 751 |
| Strain point (°C.) | 587 |
| Annealing point (°C.) | 609. |

11. A multifocal lens of claim 9 wherein the crown glass has substantially the following properties:

| | |
|---|---|
| Refractive Index | 1.601 |
| Abbe number | 40.7 |
| Coefficient of thermal expansion (per °C., (20° C.-300° C.) | $79.5 \times 10^{-7}$ |
| Density (g/cm$^3$) | 2.62 |
| Softening point (°C.) | 751 |
| Strain point (°C.) | 587 |
| Annealing point (°C.) | 609. |

12. An ophthalmic lens comprising a glass of claim 1.

* * * * *